United States Patent
Bensberg et al.

(10) Patent No.: US 10,474,668 B2
(45) Date of Patent: Nov. 12, 2019

(54) DATABASE SYSTEMS ARCHITECTURE INCORPORATING DISTRIBUTED LOG

(71) Applicant: SAP SE, Walldorf (DE)

(72) Inventors: Christian Bensberg, Heidelberg (DE);
Steffen Geissinger, Wiesloch (DE);
Thorsten Glebe, Leimen (DE)

(73) Assignee: SAP SE, Walldorf (DE)

( * ) Notice: Subject to any disclaimer, the term of this patent is extended or adjusted under 35 U.S.C. 154(b) by 296 days.

(21) Appl. No.: 15/354,883

(22) Filed: Nov. 17, 2016

(65) Prior Publication Data

US 2018/0137166 A1 May 17, 2018

(51) Int. Cl.
*G06F 16/23* (2019.01)
*G06F 16/951* (2019.01)
*G06F 16/17* (2019.01)

(52) U.S. Cl.
CPC ...... *G06F 16/2379* (2019.01); *G06F 16/1727* (2019.01); *G06F 16/951* (2019.01)

(58) Field of Classification Search
CPC ......... G06F 17/30377; G06F 17/30138; G06F 17/30864
See application file for complete search history.

(56) References Cited

U.S. PATENT DOCUMENTS

| | | | | |
|---|---|---|---|---|
| 5,897,638 A * | 4/1999 | Lasser | ................. | G06F 16/1858 |
| 6,374,243 B1 * | 4/2002 | Kobayashi | ........ | G06F 17/30377 |
| | | | | 707/703 |
| 6,728,879 B1 * | 4/2004 | Atkinson | ............... | G06Q 30/06 |
| | | | | 707/999.202 |
| 7,031,974 B1 * | 4/2006 | Subramaniam | ... | G06F 17/30575 |
| 7,277,900 B1 * | 10/2007 | Ganesh | ............. | G06F 17/30551 |
| | | | | 707/682 |
| 7,555,502 B2 * | 6/2009 | Chandrasekaran | ......................... | |
| | | | | G06F 17/30368 |
| 7,653,651 B1 * | 1/2010 | Pavlov | .............. | G06F 17/30362 |
| | | | | 707/999.103 |
| 9,208,081 B1 * | 12/2015 | Dice | .................... | G06F 12/0269 |
| 9,460,008 B1 * | 10/2016 | Leshinsky | ......... | G06F 17/30185 |
| 9,881,054 B2 * | 1/2018 | Cao | .................... | G06F 17/30392 |
| 2004/0098371 A1 * | 5/2004 | Bayliss | ............. | G06F 17/30545 |

(Continued)

OTHER PUBLICATIONS

Reed David, Method for concurrent maintenance of database with log monitor, IN 224713 B (Year: 2008).*

*Primary Examiner* — Mark D Featherstone
*Assistant Examiner* — Kweku William Halm
(74) *Attorney, Agent, or Firm* — Jones Day

(57) ABSTRACT

A query is received from a client that specifies at least one database operation implicating data within a first database and within a second database. The first database can have a first transaction manager and the second database can have a second transaction manager. Thereafter, a plurality of transactions responsive to the query are initiated to access the data within the first database and the second database. Execution of the plurality of transactions is then coordinated using the first transaction manager and the second transaction manager. All changes specified by the at least one database operation are logged in a distributed log in the first database including changes implicating data stored within the second database. The distributed log is configured such that it is accessible by both of the first transaction manager and the second transaction manager.

20 Claims, 6 Drawing Sheets

(56) References Cited

U.S. PATENT DOCUMENTS

| | | | |
|---|---|---|---|
| 2008/0114724 A1* | 5/2008 | Indeck | G06F 17/30595 |
| 2013/0117247 A1* | 5/2013 | Schreter | G06F 16/221 |
| | | | 707/703 |
| 2013/0246364 A1* | 9/2013 | Bhavith | G06F 11/1471 |
| | | | 707/648 |
| 2014/0222758 A1* | 8/2014 | March | G06F 17/30212 |
| | | | 707/638 |

* cited by examiner

DATABASE SYSTEMS ARCHITECTURE INCORPORATING DISTRIBUTED LOG

TECHNICAL FIELD

The subject matter described herein relates to database systems of differing types using a distributed log for replay, undo, and redo database operations.

BACKGROUND

Companies continue to generate increasingly larger amounts of data year over year. Rapid and convenient access to such data by a large number of concurrent users can present problems. For example, a company may store data across multiple databases of varying types which may be distributed amongst various computing nodes. These types can vary differently such as the manner in which data is stored, structured, and accessed. Typical computing architectures require separate and distinct queries to access data within the respective database types.

SUMMARY

In one aspect, a query is received from a client that specifies at least one database operation implicating data within a first database and within a second database. The first database can have a first transaction manager and the second database can have a second transaction manager. Thereafter, a plurality of transactions responsive to the query are initiated to access the data within the first database and the second database. Execution of the plurality of transactions is then coordinated using the first transaction manager and the second transaction manager. All changes specified by the at least one database operation are logged in a distributed log in the first database including changes implicating data stored within the second database. The distributed log is configured such that it is accessible by both of the first transaction manager and the second transaction manager. Data responsive to the query can later be provided to the client.

The first database can be an in-memory relational database and the second database can be a database storing data on physical disk storage. The second database can include a document store. The document store can store a collection of documents in JavaScript Object Notation (JSON) format.

Streams of data can be bijectively mapped to virtual files in persistence of the first database.

Entries can be written into a redo log during database manipulation language (DML) operations.

Newly created files can be immediately committed and made available to other transactions. The newly created files can become obsolete if all corresponding client transactions get aborted or rolled back and resulting garbage is immediately collected. The newly created files can become obsolete if all corresponding client transactions get aborted or rolled back and, subsequently, empty garbage files can be re-used upon creation of new collections or other artifacts.

Commits of pending transactions can be maintained in persistence of the first database. When the second database shuts down, a commit or abort is entirely processed in the first database and persisted. Persisted transactions can become available again after restart of the second database.

During replay operations, scan operations can be called recursively.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter is advantageous in that it allows for a single query to access/manipulate data within different database types (e.g., disk-based databases and in-memory database, etc.). In addition, the current subject matter permits the management of transactions specified by such queries across different database types that typically would require complex coordination and/or separately processed transactions. Further, the current subject matter is advantageous in that it supports both transaction isolation and statement isolation.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to the interplay among two or more databases when concurrently executing multiple transactions. In some variations, a first database acts as a master database and the other acts as a slave database with regard to transaction management. In some implementations, both databases are relational databases; however, they can differ in the manner in which they store data. For example, one database can be disk-based while the other database can be an in-memory database storing data in main memory.

Figure 1:
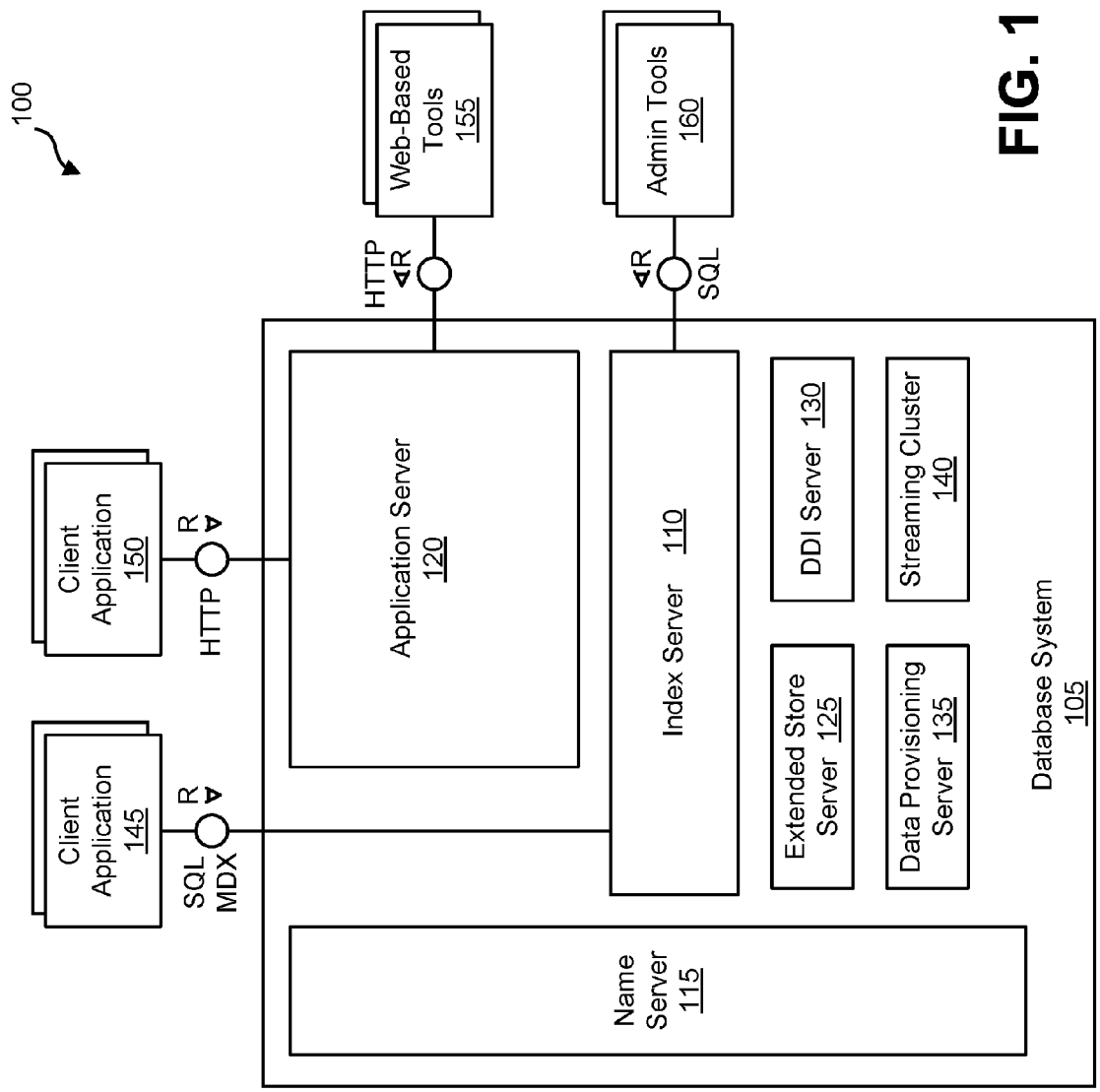
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
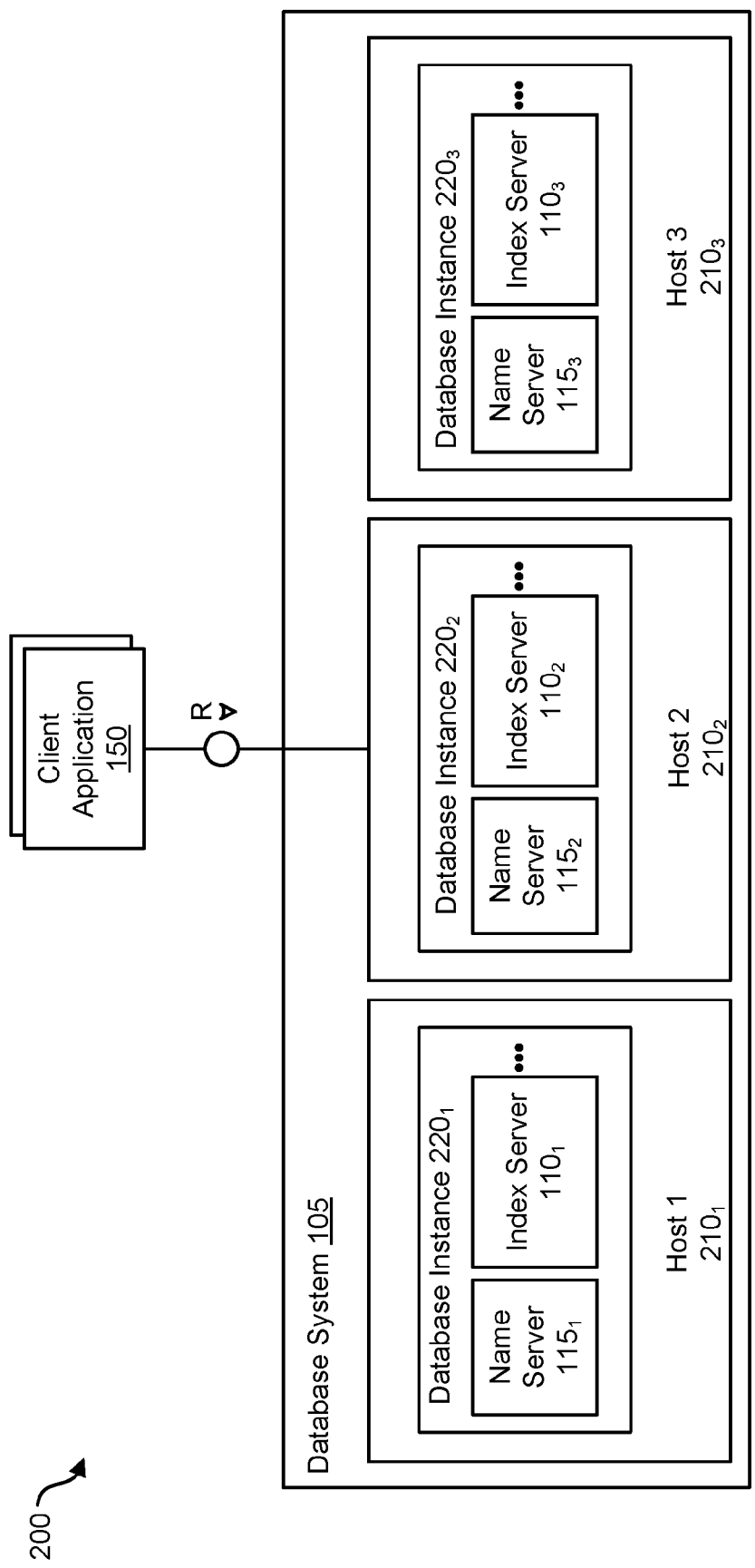
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
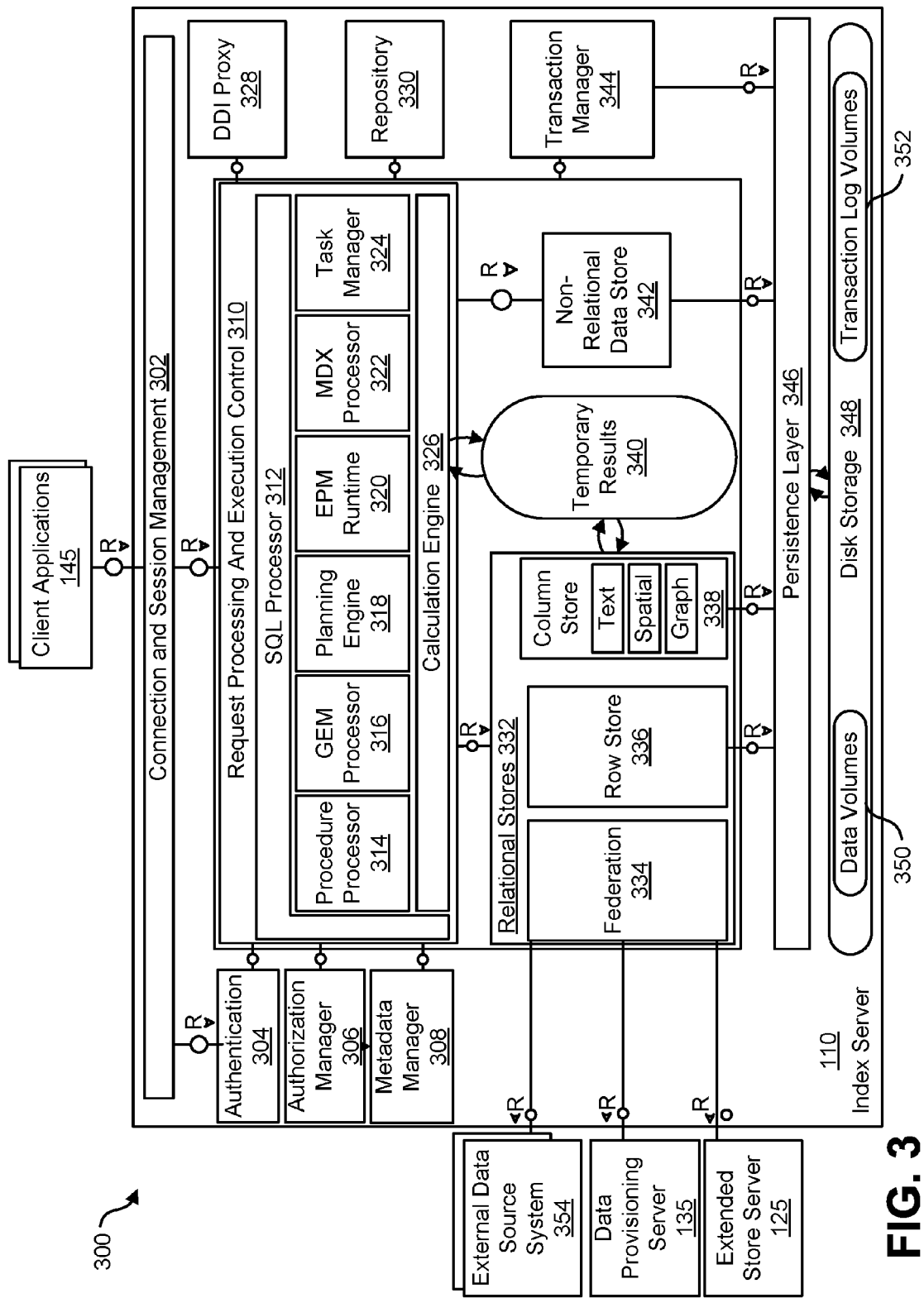
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation)

via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

Furthermore, the database system 105 can include a document store (DocStore) 358. In some arrangements, the DocStore 358 is external to the database system 105. In either arrangement, the DocStore 358 is in communication with the index server 125. The DocStore 358 is a document-oriented data store for storing, retrieving, and managing document oriented/semi-structured data (referred to herein as documents). The documents within the DocStore 358 can encapsulate and encode data in various formats such as, for example, Extensible Markup Language (XML), YAML, JavaScript Object Notation (JSON), B SON, and the like. For illustration purposes (unless otherwise specified), references are made herein of the DocStore 358 comprising a collection of JSON documents. The DocStore 358 can store the documents in physical persistence such as disk storage and/or the documents can be loaded into main memory.

The client applications 145 can initiate various transactions that involve both data within the index server 110 (e.g., data stored in the relational store 332, the non-relational data store 342, disk storage 348, etc.) as well as data within the DocStore 358. Stated differently, the database system 105 can have the same or overlapping transaction boundaries with the DocStore 358 so that coordination is required amongst the various data sources. In an arrangement, the transaction manager 344 can be made the leading or dominant transaction manager so that transaction managing facilities of the DocStore 358 or another "slave" database can be channeled and managed by transaction manager 344. Documents within the DocStore 358 can be accessed or otherwise manipulated via various protocols. For example, client applications 145 can initiate various database manipulation language (DML) statements to select, insert, delete and update data encapsulated in documents within the DocStore 358. Similarly, the client applications 145 can initiate various data definition language (DDL) statements to create, drop, alter, and rename data encapsulated within documents within the DocStore 358. As a further example, the client applications 145 can use other protocols such as QL to retrieve data encapsulated within documents in the DocStore 358.

The DocStore 358 can comprise a persistence manager as well as a separate transaction manager. The persistence manager can cause data written into the DocStore to be written into the disk storage 348 (i.e., the persistence) of the database system 105. Despite the DocStore 358 being an independent database or data store with its own dedicated binary data format, the persistence 348 of the main database system 105 can be utilized. The transaction manager of the DocStore 358 can concurrently notifies the transaction manager 344 of the index server 110 about the changes. The transaction manager 344 then oversees the commit of the data using a commit writer that assigns commit IDs to the data stored in the disk storage 348.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
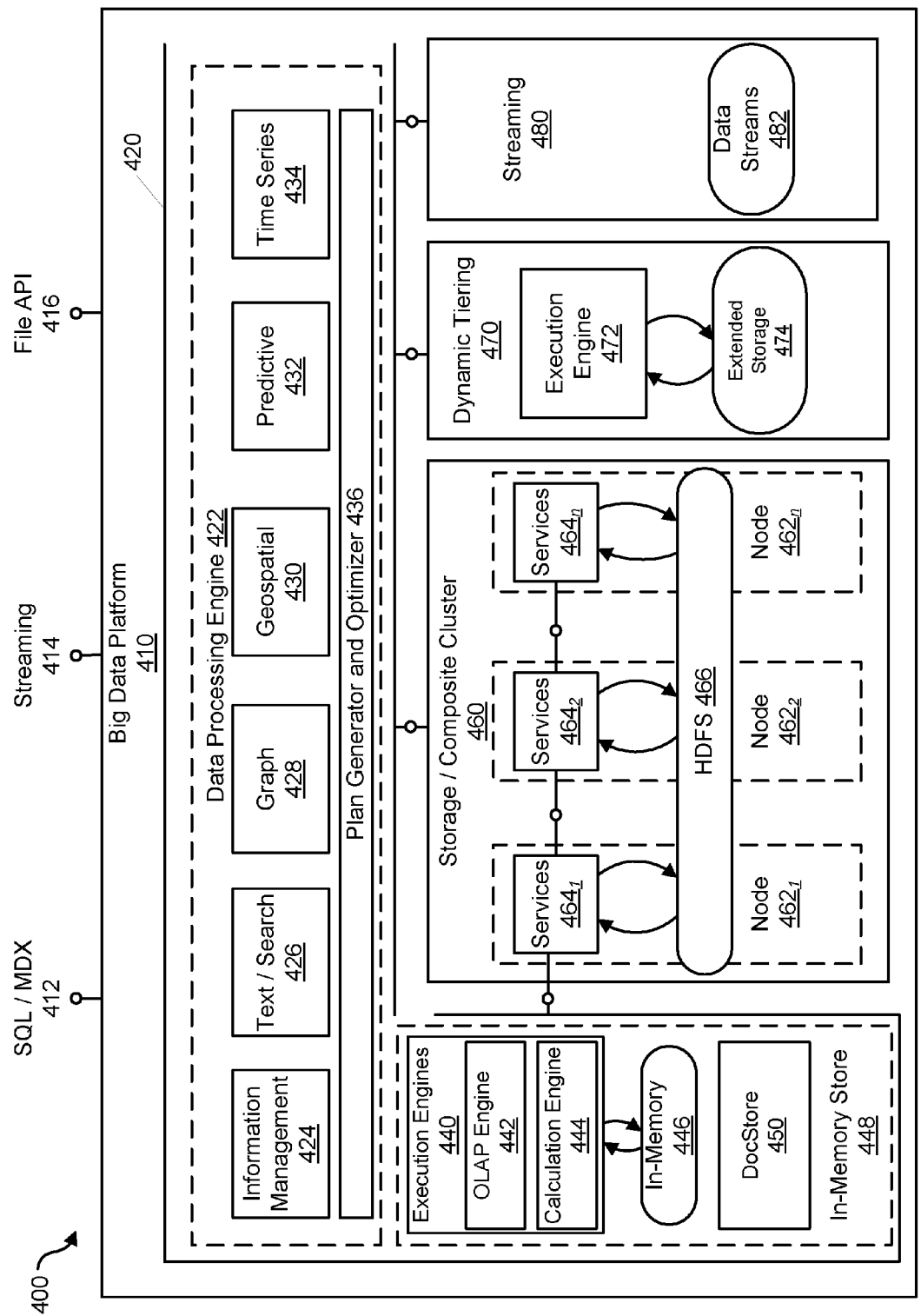
FIG. 4 is a system diagram of a big data computing platform.

FIG. 4 is a diagram 400 illustrating a big data platform 410 that is configured to handle data from a variety of sources and which provides an alternative architecture to that of FIG. 1. The big data platform 410 can leverage an in-memory engine of a database system 420 and its real-time processing, can add an analytic layer to handle data such as Hadoop data. The big data platform 410 can interface with clients or other remote computing systems via a variety of manners including SQL/MDX 412, streaming data interfaces 414 (e.g., APACHE SPARK framework data, etc.), and File Application Programming Interfaces (APIs) 416 (which can be optimized according to the Hadoop Distributed File System protocol).

The database system 420 forming part of the big data platform 410 can include a data processing engine 422 for handling various types of disparate data including, without limitation, information management data 424, text/search data 426, graph data 428, geospatial data 430, predictive data 432, and/or time series data 434. The data processing engine 422 can also include a plan generator and optimizer 436 that can generate optimal query execution plans.

The query execution plans can be executed, at least in part, by execution engines 440 including, for example, by an OLAP engine 442 and/or a calculation engine 444. The execution engines 440 can be part of an in-memory store 448 that includes in-memory storage 446. The big data platform 410 can also include a document store 450 (having similar functionality to that of document store 358 of FIG. 3) such that queries received by the big data platform 410 can relate to both data within the in-memory storage 446 and the document 450. The document store 450 can be part of the in-memory story 448 in some variations, or in other variations, the document store can be an engine within the data processing engine 422.

The big data platform 410 can include a storage/computing cluster 460 that comprises a plurality of computing nodes $462_{1...n}$ which each execute services $464_{1...n}$. These services $464_{1...n}$ can comprise application specific services that are unique to the corresponding node $462_{1...n}$ as well as shared application services that can be used across multiple computing nodes $462_{1...n}$ by way of a Hadoop Distributed File System (HDFS) 466. The HDFS 466 is a primary storage system used by HADOOP applications which provides provides high-performance access to data across the nodes $462_{1...n}$.

The architecture of the big data platform 410 allows, via the file API 416, huge amounts of data stored in HADOOP can be integrate with data from enterprise systems within the database system 105 so that developers and data analysts have instant access to the aggregated data and can make contextually-aware decisions.

The big data platform 410 can also include dynamic tiering module 470 which provides, using an execution engine 472 and extended storage 474, the ability to, on-demand, extend the storage capabilities of the database system 105. This arrangement is beneficial in cases in which the amount of data to be stored can vary greatly and unexpectedly (and is analogous to the extended store server 125 of FIGS. 1 and 3).

Further, the big data platform 410 can include a streaming module 480 that can enable real-time processing of data streams 482 (e.g., APACHE SPARK framework data streams received by the streaming interface 414, etc.) as well as analytics on huge volumes of complex event data (such as that which could be created by an array of IoT devices). Further, the big data platform 410, by way of the streaming module 480, can extract actionable information from event streams and generate alerts when fast action is needed. The big data platform 410 can also initiate automatic responses to changing conditions based on a single event, or a combination of events. Further, the big data platform 410 can allow for the rapid development of applications with built-in complex event processing capabilities.

Figure 5:
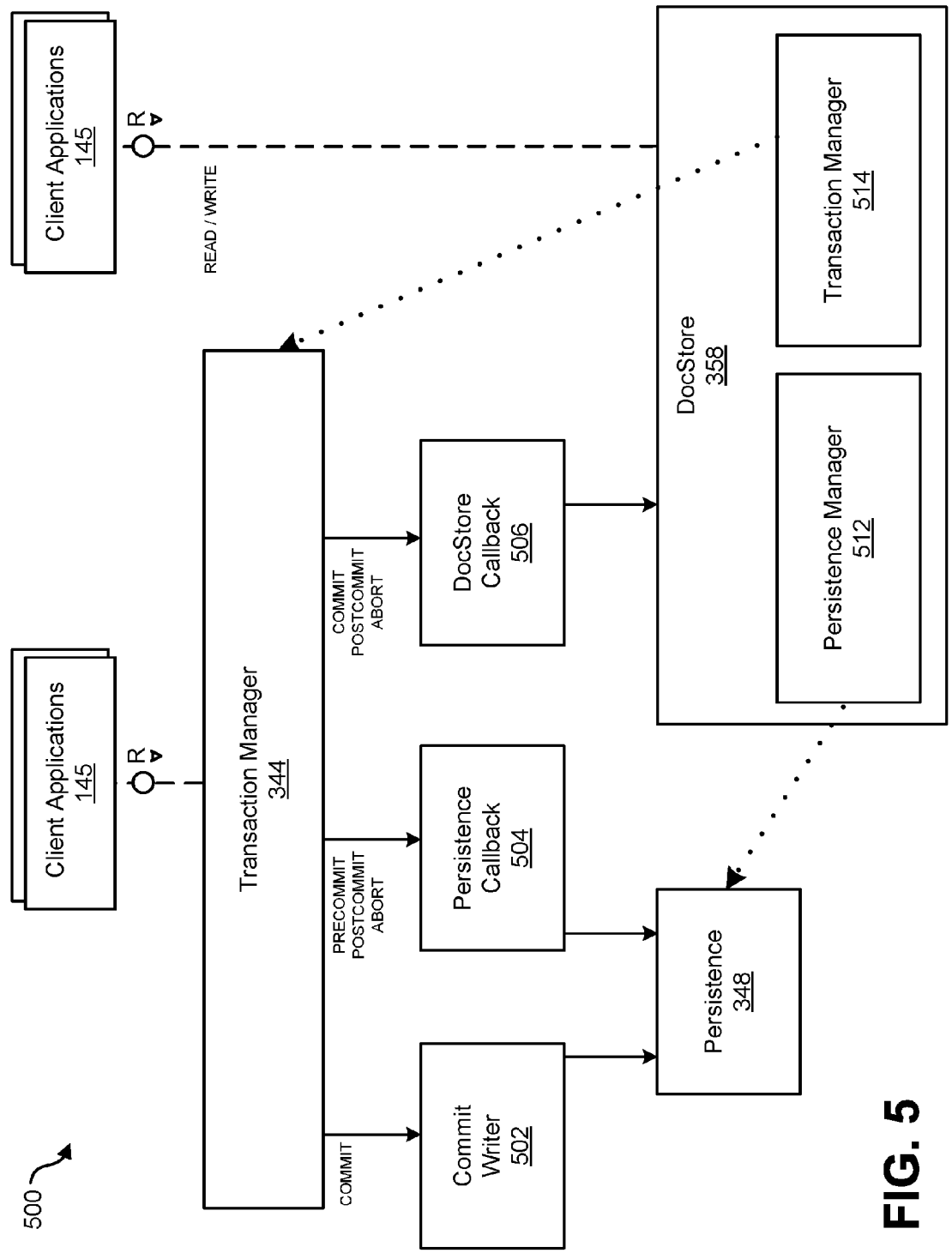
FIG. 5 is a system diagram of an document store and its interaction with a database system such as illustrated in FIG. 1.

FIG. 5 is a diagram 500 illustrating an arrangement including the document store (DocStore) 358 which can form part of the database system 105. In some arrangements, the DocStore 358 is external to the database system 105. In either arrangement, the DocStore 358 is in communication with the index server 125. The DocStore 358 can comprise a persistence manager 512 as well as a separate transaction manager 514. The persistence manager 512 can cause data written into the DocStore to be written into the disk storage 348 (i.e., the persistence) of the database system 105. Despite the DocStore 358 being an independent database or data store with its own dedicated binary data format, the persistence of the main database system 105 is utilized. The transaction manager 514 of the DocStore 345 concurrently notifies the transaction manager 344 of the index server 110 about the changes. The transaction manager 344 then oversees the commit of the data using a commit writer 502 that assigns commit IDs to the data stored in the disk storage 348. The commit IDs are always in order for all transactions, irrespective whether they touched the DocStore 358 or not. For operations other than commits (e.g., precommit, post-commit, abort), the transaction manager 344 notifies the persistence callback 504 to take the appropriate action in the persistence 348. For example, the postcommit is used to equip all data changes made during a transaction with the corresponding commit ID. The commit ID is determined during the commit itself and hence is not yet available when the data for a transaction is first written. Similarly the transaction manager notifies the DocStore callback 506 to take the appropriate action (e.g., undo, redo, etc.) in the DocStore 358.

Multiple transactions can be processed independently from each other. Whether a row in the database system 105 or a document in the DocStore 358 is visible, or whether a change to a row or document is visible, depends on the Read Commit ID of a transaction and the isolation level. For a given transaction, the user or application can specify an isolation level. For transaction isolation, it is ensured that all statements being executed in the boundaries of the transaction operate on the same snapshot. As an example, if a query reads a certain row, value or document, it is ensured that it reads the exact same data if it is queried again even though another transaction has modified or deleted the data in the meantime and has committed. For statement isolation level, the guarantee is less: the data that is being read by a statement is still consistent, but if the data gets modified or deleted between statements, the latest data is retrieved. A so-called Consistent View is used and associated with a transaction. For transaction isolation, the Read Commit ID is set when the transaction starts and is being kept constant. Each time when accessing data, the Read Commit ID is used to check whether data is visible for the given transaction or not. For statement isolation, the Read Commit ID is updated at the beginning of each statement and being set to the highest Commit ID in the system.

When transactions span multiple databases—the relational tables of the database system 105 and the DocStore 358—it is essential that the same Consistent View is being used. Moreover, the commit has to be atomic. Atomicity means that a change has either been fully made or not at all. In order to ensure that, a query or statement that is being executed in the DocStore 358 does have the correct knowledge of whether a change is visible or not. Per change a Transaction Control Block (TCB) is being maintained. When the main transaction manager 344 sends the post-commit to the DocStore 358 for a given transaction, the corresponding Transaction Control Blocks can be updated immediately or asynchronously. During this step, the commit ID is being written into the TCB. In an example, the TCB is being set to commit ID 100. Query A is being executed and according to its Consistent View, its Read Commit ID is 99. As the TCB has commit ID 100, the change is not yet visible for Query A. Query B is being executed and according to its Consistent View, its Read ID is 100 or 101. In both cases, the change is visible for the query and the change has to be considered. This way, if the TCB is set with a Commit ID, it is efficient to determine whether a change is visible or not.

Assuming that the TCB has not yet been updated for a change, the DocStore 358 cannot determine on its own whether the corresponding change is visible or not. The main transaction manager 344 cannot notify the DocStore upon the commit—as a commit has to be atomic. The main transaction manager 344 does call callback procedures though to the DocStore transaction manager 414 to notify it, but it does so asynchronously for performance reasons. Also the transaction manager 414 may operate asynchronously and update TCBs in bulk operations and not upon every post-commit of the main transaction manager 344.

In these cases, while processing queries in the DocStore 348, the DocStore 358 may encounter TCBs without a commit ID. It will query the main transaction manager 344 to get the latest state. In some implementations, the main transaction manager 344 can be built with the same concepts of having TCBs. In this case the DocStore 358 can directly access the memory location of the TCB of the main transaction manager 344.

With the architecture of FIG. 5, as noted above, the transaction manager 344 is unable to directly notify the DocStore 358 of commits (given its separation from the database system 105). Rather, the transaction manager 344, via the commit writer 402, writes commits with their commit IDs permanently into the persistence 348 of the index server 110. During the precommit callbacks, data (e.g. redo or undo logs) may be written. Also the state of TCBs can be changed and/or in some implementations be locked. During postcommit or abort, the TCB state can again be changed and/or in some implementations be unlocked. In some implementations the DocStore 358, being a slave database, can use a persistence interface suited for an environment with a so-called distributed log. In such an environment, memory artifacts are being bijectively mapped to independent streams of data that may be read and written independently. When objects—like collections—are being dropped, related streams may become obsolete and may therefore be deleted. The streams may contain redo and undo log and have unique identifiers so that the relation from object/memory artifact/purpose to the stream can be facilitated.

As an example, the mapping of a collection of documents to streams is illustrated. In some implementations, a collection may have a dedicated stream for the document data, additionally there may be a stream or streams for the dictionary, the index, for statistics and the like. Moreover, a collection may be partitioned or internally organized in so-called slices that also make up independent streams. When a collection is first created (e.g. via a DDL statement), the catalog (yet another memory artifact with its dedicated stream) is modified and documents are added to the collection. During this process, the collection is added to the catalog stream, so that when the catalog stream is being replayed (e.g. during the startup of the process), information on available collections and their stream identifiers becomes available. If further streams are available for a collection, this information may also be kept in the catalog or within the data of the collection itself—and therefore in the "main" stream for a collection.

In an example, a collection may have stream ID 100. The corresponding dictionary may be stored in stream ID 101. The catalog contains the information of which streams exist and belong to which collection. In another implementation option, a collection may have a dedicated stream, for example stream 100. The corresponding dictionary may have ID 100D and the index 100I. It may not be known via metadata whether an index for collection/stream ID 100 exists. In this case, it may be probed whether the stream exists.

The distributed log can be built in a way that it is only written (append-only) during a commit and that the data that is then written is the atomic commit. When integrating the DocStore 358 into the master database (i.e., database system 105), the commit is performed by the main transaction manager 344 and the DocStore 358 can only be invoked upon precommit and postcommit. Therefore, the original pattern is not possible and has to be fitted into the architecture and behavioral patterns of the main database. When writing the commit to the distributed log, a sequential commit ID can be determined and written to the log. When a transaction commits, all related streams are written/appended. These streams are always written in the order of the commits—this way upon replay, their entries may be read in their order and also replayed in the in-memory structures in exactly that order. Replaying in order is necessary as otherwise data corruption may occur—if A is updated to 1 in one transaction and later on A is updated to 2 in another transaction, it is crucial that after replay the value for A is 2. In the described implementation, there is no data being written to the persistence during DML statements. As an example, when a document is inserted to the DocStore 358, the in-memory representation can be modified so that it contains the new document, but this document is first written to the persistence upon the commit. For transaction that insert many documents or modify many documents, it is the commit that is I/O intense. As commits have to be in order, a transaction with a lot of data may block the commit of other smallish transactions that occur later in time.

When integrating the DocStore 358 into the master database (e.g., database system 105, etc.), the very same persistence infrastructure 348 can be used. By doing so, DocStore 358 transactions can properly participate in the transactions controlled by transaction manager 344 via commit writer 402 and persistence callback 404, and moreover be part of the overall database image. The latter means that all data is properly backed up, may be fully recovered or recovered via point in time recovery. It can also provide that a failover to standby host may be facilitated with the existing means of the master database (e.g., database system 105, etc.).

The persistence manager 512 can implement the scan, write and delete interface for the distributed log and can map the operations to the persistence interface of persistence 348. Checking the existence of a stream (as described above) can be facilitated by the scan interface.

Persistence 348 can use so-called virtual files. Each stream can map to a file name with a unique, bijective mapping. Entries can be added to a virtual file during DML operations (e.g. insert and update) and during the precommit. For each entry that is being made, its transaction ID can be written as metadata. The commit itself can be handled independently from the virtual files by commit writer 402 as described above. The commit ID can be determined during the commit. The persistence callback 404 adds the commit ID to all respective entries. For the native implementation for the distributed log, there was no persistence operation for DML—this may be added when using virtual files. Entries to virtual files—and therefore to the persistence—can be written in the order in which the entries are being added. As DML statements and the commit are loosely coupled, the entries need not necessarily be made in the order of the commits due to multithreaded execution of transaction.

In the following example two active transaction 100 and 102 write to the stream 1000. The following entries are being made in Table 1:

TABLE 1

| Transaction ID | Commit ID | Payload version | Payload length | Payload |
|---|---|---|---|---|
| 100 | <unassigned> | 1 | 68 | <binary data> |
| 100 | <unassigned> | 1 | 343 | <binary data> |
| 102 | <unassigned> | 1 | 35 | <binary data> |
| 100 | <unassigned> | 1 | 445 | <binary data> |
| 102 | <unassigned> | 1 | 543 | <binary data> |

The entries for transactions 100 and 102 are interleaving due to the parallel execution. The Commit ID is left unassigned as the transactions are still ongoing. A metadata field identifies the payload version of the binary format. Subsequent versions of the product may require a different binary format. In that case the version will be increased accordingly. During the postcommit the Commit ID will be set. The following table will show the entries after transaction with ID 100 is committed and the Commit ID is set to 4000.

TABLE 2

| Transaction ID | Commit ID | Payload version | Payload length | Payload |
|---|---|---|---|---|
| 100 | 4000 | 1 | 68 | <binary data> |
| 100 | 4000 | 1 | 343 | <binary data> |
| 102 | <unassigned> | 1 | 35 | <binary data> |
| 100 | 4000 | 1 | 445 | <binary data> |
| 102 | <unassigned> | 1 | 543 | <binary data> |

If the server crashes before transaction 102 is committed, or if it is explicitly rolled back, e.g. by the application, the Commit ID remains as unassigned. After restart of the database, unassigned entries are not present anymore.

The DocStore 358 scans streams with given Commit ID ranges. The entries of a redo log have to be replayed in the order of the Commit IDs to preserve consistency. When reading the entries from the virtual file, the entries are filtered by Commit ID range. The entries are then ascendingly ordered by Commit ID. There may be more than one entry per Commit ID. As DML statements write their data sequentially per transaction, it is guaranteed that all entries for one transaction are already in the correct order. Hence the ordering of the Commit ID must be order-preserving for the entries within one transaction.

During replay, the scan operation is typically called recursively. As an example, the catalog is scanned first. It contains two entries, one redo entry for collection 1 and one for collection 2. Right after reading the redo entry for collection 1, the redo is being replayed. This causes that other streams are being read synchronously. Once all relevant streams for collection 1 are processed, the next redo entry of the catalog is replayed; this is the one for collection 2 which in turn will trigger the scan of further streams.

The DocStore 358 can include a cleaner which, along with the persistence manager 512, can delete virtual files that become obsolete. Virtual files may become obsolete when collections or other artifacts like indices are dropped.

In a distributed log, the creation of new streams can be explicitly controlled as it happens during the commit. As commits are synchronized, i.e. there is a lock, there can only be one thread at a time that might create a new stream. With the mapping to virtual files and writing to the virtual files during DML and the lack of a dedicated and synchronized "create stream" operation, there may be multiple threads that intend to write to a virtual file for the first time. The first time has to be detected and the file has to be created. The newly created file has to be visible to all concurrent transactions that might be required to see and use the virtual file. Creation of virtual files works similarly to the transaction mechanisms described for the visibility of rows or documents: the newly created virtual file is only visible to other transactions after the creation has been committed and the Read Commit ID of other transactions is higher or equal of the Commit ID that created the virtual file. To facilitate this, the following techniques are being used: 1) If a virtual file is to be created, a lock is obtained to synchronize all file creations, 2) A dedicated transaction is started that is independent from the outer DML transaction, 3) the virtual file is created 4) The inner transaction is committed; in order to make this commit immediately visible to all other concurrent transactions, commit ID 1 is used; this way Commit ID is lower than any other used Read Commit ID. The lock mentioned in step 1 ensures that only one file is created per stream. After obtaining the lock, a thread has to check whether another thread may have created the file in the meantime; and if yes, use that file. If the outer DML operation is eventually rolled back, the created virtual file remains as it was committed in its dedicated transaction. This arrangement is intentional; otherwise it could happen that other entries that were written by other (committed) transactions would get deleted as well. But it may also happen that files remain as garbage if they are not used anymore if all outer transaction got rolled back, for example including the "create collection DDL". As the stream IDs are being used as file names for the virtual files and as stream IDs are sequential, the amount of empty garbage files is limited as illustrated in the following example. Assuming collection 1 is created with stream ID 100. Everything is rolled back, the empty virtual files for collection 1 remain in the system. Collection 2 is created, it will use stream ID 100, as it is the next free stream ID. The check whether virtual files for stream ID 100 exist will return true and the former garbage files are now being used for collection 2.

Figure 6:
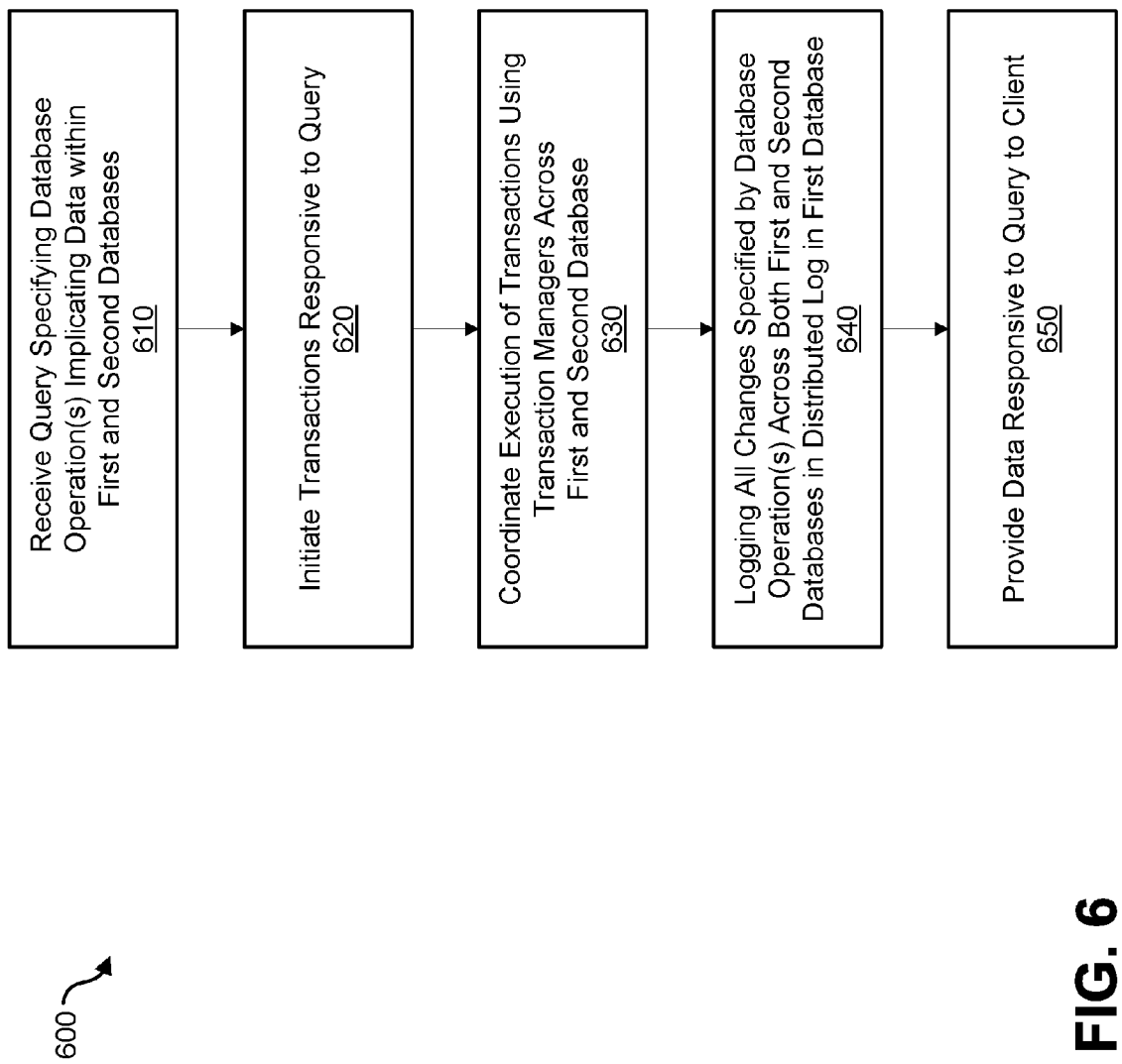
FIG. 6 is a process flow diagram illustrating the use of a distributed log by two or more databases having different types.

FIG. 6 is a process flow diagram 600 in which, at 610, a query is received from a client that specifies at least one database operation implicating data within a first database and a second database. The first database can include a first transaction manager and the second database can include a second, separate and distinct transaction manager. Thereafter, at 620, a plurality of transactions responsive to the query are initiated to access the data within the first database and the second database. The first transaction manager and the second transaction manager then coordinate, at 630, execution of the plurality of transactions. As part of the transaction execution, at 640, all changes specified by the at least one database operation are logged in a distributed log in the first database accessible to the first transaction manager and the second transaction manager including changes implicating data stored within the second database. Optionally, at 650, data is later provided to the client that is responsive to the query.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, from a client, a query specifying at least one database operation implicating data within a first database and within a second database, the first database comprising a first transaction manager and the second database comprising a second transaction manager;
initiating a plurality of transactions responsive to the query to access the data within the first database and the second database;
coordinating, using the first transaction manager and the second transaction manager, execution of the plurality of transactions;
logging all changes specified by the at least one database operation in a distributed log in the first database including changes implicating data stored within the second database, the distributed log being accessible by both of the first transaction manager and the second transaction manager; and
providing data responsive to the query to the client;
wherein:
streams of data are bijectively mapped to virtual files in persistence of the first database such that:
if a virtual file is to be created, a lock is obtained to synchronize all file creations:
a dedicated transaction is started that is independent from an outer database manipulation language (DML) transaction;
the virtual file is created;
entries are added to the virtual file during DML operations and during a precommit;
an inner transaction is committed and made visible to all other concurrent transactions; and
if an outer DML operation is rolled back, the created virtual file remains as it was committed in its dedicated transaction.

2. The method of claim 1, wherein the first database is an in-memory relational database and the second database is a database storing data on physical disk storage.

3. The method of claim 2, wherein the second database comprises a document store.

4. The method of claim 3, wherein the document store stores a collection of documents in JavaScript Object Notation (JSON) format.

5. The method of claim 1 further comprising:
writing entries into a redo log during database manipulation language (DML) operations.

6. The method of claim 1, wherein newly created files are immediately committed and made available to other transactions.

7. The method of claim 6, wherein the newly created files become obsolete if all corresponding client transactions get aborted or rolled back and resulting garbage is immediately collected.

8. The method of claim 6, wherein the newly created files become obsolete if all corresponding client transactions get aborted or rolled back and, subsequently, empty garbage files get re-used upon creation of new collections or other artifacts.

9. The method of claim 1, wherein commits of pending transactions are maintained in persistence of the first database.

10. The method of claim 9, wherein when the second database shuts down, a commit or abort is entirely processed in the first database and persisted.

11. The method of claim 10, wherein persisted transactions become available again after restart of the second database.

12. The method of claim 1, wherein, during replay operations, scan operations are called recursively.

13. A system comprising:
at least one data processor;
memory storing instructions which, when executed by the at least one data processor, result in operations comprising:
receiving, from a client, a query specifying at least one database operation implicating data within a first database and within a second database, the first database comprising a first transaction manager and the second database comprising a second transaction manager;
initiating a plurality of transactions responsive to the query to access the data within the first database and the second database;
coordinating, using the first transaction manager and the second transaction manager, execution of the plurality of transactions;
logging all changes specified by the at least one database operation in a distributed log in the first database including changes implicating data stored within the second database, the distributed log being accessible by both of the first transaction manager and the second transaction manager; and
providing data responsive to the query to the client;
wherein:
streams of data are bijectively mapped to virtual files in persistence of the first database such that:
if a virtual file is to be created, a lock is obtained to synchronize all file creations;
a dedicated transaction is started that is independent from an outer database manipulation language (DML) transaction;
the virtual file is created;
entries are added to the virtual file during DML operations and during a precommit;
an inner transaction is committed and made visible to all other concurrent transactions; and
if an outer DML operation is rolled back, the created virtual file remains as it was committed in its dedicated transaction.

14. The system of claim 13 further comprising the first database and the second database, wherein the first database is an in-memory relational database and the second database is a database storing data on physical disk storage.

15. The system of claim 14, wherein the second database comprises a document store.

16. The system of claim 15, wherein the document store stores a collection of documents in JavaScript Object Notation (JSON) format.

17. The system of claim 13,
wherein newly created files are immediately committed and made available to other transactions;
wherein the newly created files become obsolete if all corresponding client transactions get aborted or rolled back and resulting garbage is immediately collected.

18. The system of claim 17, wherein the newly created files become obsolete if all corresponding client transactions get aborted or rolled back and, subsequently, empty garbage files get re-used upon creation of new collections or other artifacts.

19. The system of claim 18, wherein:
commits of pending transactions are maintained in persistence of the first database;
when the second database shuts down, a commit or abort is entirely processed in the first database and persisted;
persisted transactions become available again after restart of the second database; and
during replay operations, scan operations are called recursively.

20. A non-transitory computer program product storing instructions which, when executed by at least one data processor, result in operations comprising:
receiving, from a client, a query specifying at least one database operation implicating data within a first database and within a second database, the first database comprising a first transaction manager and the second database comprising a second transaction manager;
initiating a plurality of transactions responsive to the query to access the data within the first database and the second database;
coordinating, using the first transaction manager and the second transaction manager, execution of the plurality of transactions;
logging all changes specified by the at least one database operation in a distributed log in the first database including changes implicating data stored within the second database, the distributed log being accessible by both of the first transaction manager and the second transaction manager; and
providing data responsive to the query to the client;
wherein:
streams of data are bijectively mapped to virtual files in persistence of the first database such that:
if a virtual file is to be created, a lock is obtained to synchronize all file creations;
a dedicated transaction is started that is independent from an outer database manipulation language (DML) transaction;
the virtual file is created;
entries are added to the virtual file during DML operations and during a precommit;
an inner transaction is committed and made visible to all other concurrent transactions; and
if an outer DML operation is rolled back, the created virtual file remains as it was committed in its dedicated transaction.

* * * * *